United States Patent

[11] 3,569,998

| | | |
|---|---|---|
| [72] | Inventor | Hisashi Eguchi<br>Tokyo, Japan |
| [21] | Appl. No. | 780,624 |
| [22] | Filed | Dec. 3, 1968 |
| [45] | Patented | Mar. 9, 1971 |
| [73] | Assignee | Iwatsu Electric Co., Ltd.<br>Tokyo, Japan |
| [32] | Priority | Dec. 15, 1967 |
| [33] | | Japan |
| [31] | | 42/80090 |

[54] APPARATUS FOR GENERATING A RECTILINEAR SWEEP OF VOLTAGE
9 Claims, 2 Drawing Figs.

[52] U.S. Cl............................................. 307/228,
307/229, 307/286, 328/127, 328/181
[51] Int. Cl............................................. H03k 4/12
[50] Field of Search.......................................... 307/228,
229, 286; 328/127, 181, 185

[56] References Cited
UNITED STATES PATENTS

| | | | | |
|---|---|---|---|---|
| 2,569,164 | 9/1951 | Greenwood, Jr. et al..... | | 328/185X |
| 3,124,706 | 3/1964 | Alexander................... | | 307/228 |
| 3,138,764 | 6/1964 | Dalton et al. ................. | | 307/228X |
| 3,277,319 | 10/1966 | Stevens, Jr.................... | | 307/228 |
| 3,484,624 | 12/1969 | Rasiel et al. ................. | | 307/228X |

*Primary Examiner*—Stanely D. Miller, Jr.
*Attorney*—Woodcock, Phelan and Washburn ABSTRACT: Apparatus for generating a rectilinear sweep of voltage in response to a triggering signal includes an integrator provided with a first DC coupled feedback path including an amplifier which is normally released and inhibits the integrator, a bistable circuit responsive to a triggering signal to inhibit the amplifier and release the integrator whereby a rectilinear sweep of voltage is generated by the circuit, and a second feedback path from the output of the integrator to the input of the bistable circuit to reset the bistable circuit when the output of the integrator reaches a predetermined level.

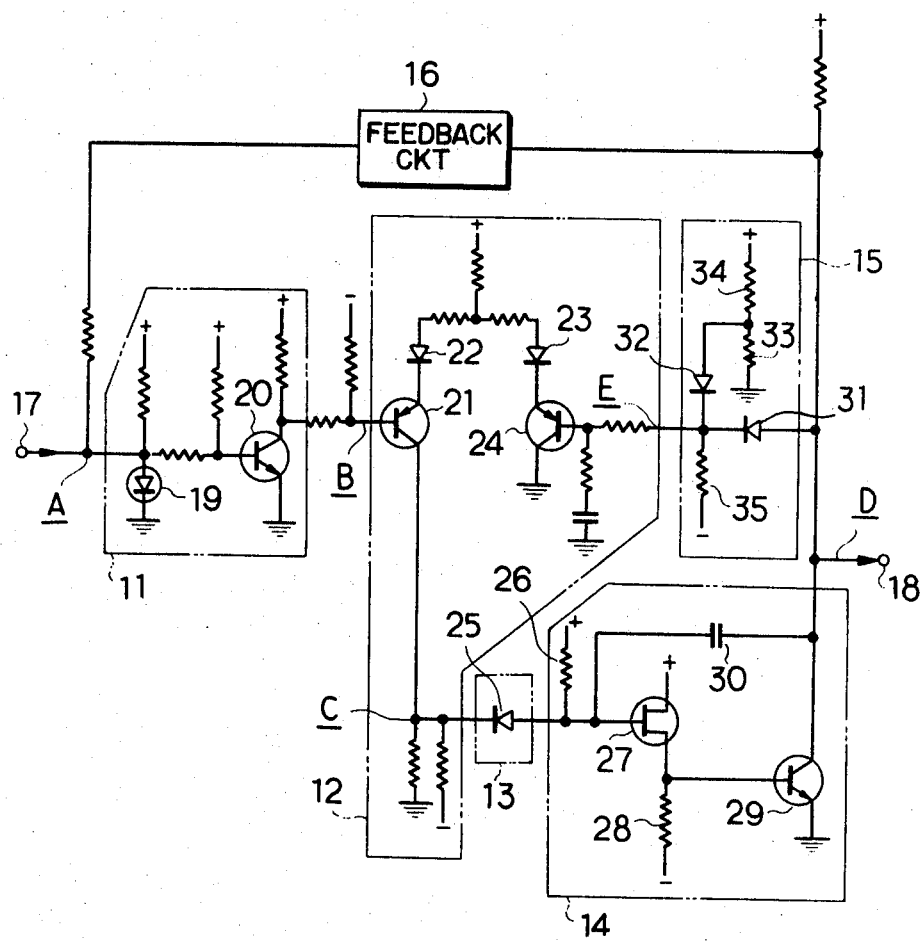

APPARATUS FOR GENERATING A RECTILINEAR SWEEP OF VOLTAGE

This invention relates to apparatus for generating a voltage varying rectilinearly with time. Such apparatus is used, for example, for generating time-base waveforms and as a triggered sweep circuit used for time-base sweep in an oscilloscope, which is arranged to generate a rectilinear voltage sweep synchronously with, or delayed relatively to, a triggering signal.

In such apparatus it is difficult to obtain sweep waveforms maintaining a predetermined degree of linearity especially when the sweep time of the voltage from one level to another is changed. It is even more difficult to keep constant the datum level of the sweep when the sweep time is changed.

An object of this invention is to provide improved apparatus for generating a rectilinear voltage sweep in which a predetermined degree of linearity of the voltage sweep can be maintained even when the sweep time is changed.

Another object of this invention is to provide improved apparatus for generating a rectilinear voltage sweep in which the datum potential of the sweep can be kept constant even when the sweep time is varied.

According to present invention apparatus for generating a rectilinear sweep of voltage in response to a triggering signal comprises an integrating circuit of which the output is coupled to the input thereof through a first DC-coupled negative feedback circuit including an amplifier such that, in operation, the integrating function of the integrating circuit is normally inhibited, and means for releasing the integrating circuit to perform its integrating function and provide a rectilinear sweep of output voltage, comprising a bistable circuit coupled to the amplifier and responsive to a triggering signal to change its state from a reset state in which the amplifier is released and functions in the negative feedback circuit to inhibit the integrating circuit to a set state in which the amplifier is inhibited in its feedback function and releases the integrating circuit to perform its integrating function, and a second feedback circuit from the output of the integrating circuit to the input of the bistable circuit to reset the bistable circuit when the output of the integrating circuit reaches a predetermined value.

The invention will now be described, by way of example, with reference to the accompanying drawings.

DESCRIPTION OF THE PREFERRED EMBODIMENTS

Figure 1:
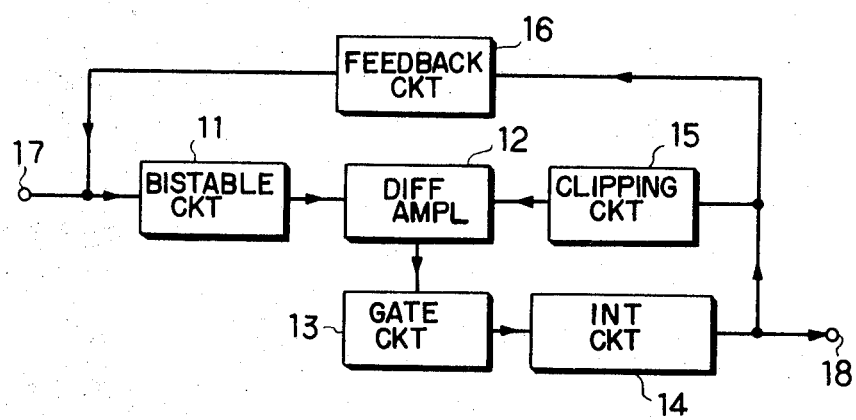
FIG. 1 is a block diagram of one embodiment of a rectilinear voltage generator in accordance with this invention.
Figure 2A:
FIG. 2 is a circuit diagram in more detail of the voltage generator shown in FIG. 1, and FIGS. 3A—3E are explanatory FIGS. showing the relationship of voltages or currents as they occur in the circuit of FIG. 2.
Figure 2B:
Figure 2C:
Figure 2D:
Figure 2E:

Referring to the drawings in detail, and initially to FIG. 1 thereof, it will be seen that the linear voltage generator in accordance with this invention illustrated in the block diagram comprises a bistable circuit 11, a differential amplifier circuit 12, a gate circuit 13, an integrating circuit 14, a clipping circuit 15 and a feedback circuit 16.

The bistable circuit 11 is usually in its reset state, and is so arranged as to be put into its set state only when an input pulse is applied to an input terminal 17. The differential amplifier circuit 12 is released and generates output within its linear-amplifying range when the bistable circuit 11 is in its reset state. The gate circuit 13 is held open only when there is the output from the differential amplifier circuit 12. The integrating circuit 14 is inhibited when the gate circuit 13 is open, and performs its integrating function only when the gate circuit is closed. The clipping circuit 15 has the function of restricting to a given level the feed from the output of the integrating circuit to the opposite input terminal of the differential amplifier circuit 12 to that connected to the bistable circuit 11. The feedback circuit 16 feeds the output of the integrating circuit 14 back to the input terminal of the bistable circuit 11, thereby resetting the bistable circuit 11 whenever the output of the integrator reaches a given level.

It will be appreciated that a negative feedback circuit is formed from the output of the integrating circuit 14 through the clipping circuit 15, the differential amplifier circuit 12 and the gate circuit 13 to the input of the integrating circuit 14, thus fixing the input and output voltages of the integrating circuit 14, which is thereby inhibited. However, when an input pulse is applied to the bistable circuit 11 from the in terminal 17, the bistable circuit 11 is set, and the differential amplifier circuit 12 is saturated or inhibited and in this state provides no output to the gate circuit 13 which is opened thereby. This causes the integrating circuit 14 to be released and its integrating function starts. In addition, since the output voltage change of the integrating circuit 14 applied to the other input terminal of the differential amplifier circuit 12 is limited by the clipping circuit 15, the differential amplifier circuit 12 remains inhibited, i.e. it is not allowed to move into its linear amplifying range. However, the output voltage change of the integrating circuit 14 is fed back to the input of the bistable circuit 11 through the feedback circuit 16, and when a predetermined level is reached the bistable circuit 11 is reset and all circuits return to their initial states in which the amplifier 12 is released and the integrating circuit is inhibited.

Thus, every time an input impulse is applied to the input terminal 17, a single sweep of output voltage synchronized by the input impulse is provided at the output terminal 18 at the output of the integrating circuit 14.

Referring now to FIG. 2, this is a circuit diagram of the generator shown as a block diagram in FIG. 1, and FIG. 3 is an explanatory diagram showing the relationship of voltages or currents as they occur in the circuit shown in FIG. 2.

A tunnel diode of Esaki diode 19, together with a transistor 20, forms the bistable circuit 11. The base of the transistor 20 is driven by the diode 19, and is in a nonconductive state when the diode 19 has no input from the input terminal 17. This is the reset state of the bistable circuit. The differential amplifier circuit 12 comprises transistors 21 and 24 connected as a long tail pair, and the output terminal B of the bistable circuit 11 is connected to one input terminal of the differential amplifier circuit 12, that is to the base of the transistor 21. Furthermore, the output terminal of the integration circuit 14 is connected to the other input terminal E of the differential amplifier circuit 12 through the slipping circuit 15. The point E, as well be described later, is of a potential almost the same as the point B when the bistable circuit is reset whereby the transistors 21 and 24 of the differential amplifier circuit 12 operates in its linear-amplifying range. The output terminal C of the differential amplifier circuit 12 is connected through the gate circuit 13, comprising the diode 25, to the integrating circuit 14, comprising a field effect transitor 27, a resistor 28, a Planar transistor 29, a resistor 26, and a capacitor 30.

When the bistable circuit 11 is in its reset state the diode 25 is supplied with a current through the resistor 26, and is in a conductive state. With the gate circuit 13 thus open, the integrating circuit 14 has the potential of its input and output terminals fixed, whereby its integrating function is inhibited. The resistance 28 represents the bias resistance of transistors 27 and 29.

With the circuit in this state a diode 31 in the clipping circuit 15 is in a conductive state, and a diode 32 is in a nonconductive state. As a result, the anode potential of the diode 32, which is substantially determined by the resistance values of resistors 33 and 34 connected as a potential divider across a source of voltage is below the anode potential of the diode 31, that is the output potential before the start of the integrating function of the integrating circuit 14, whereby the diode 31 is biased in a forward direction through a resistor 35. The output potential of the clipping circuit 15 is applied to the input terminal E of the differential amplifier circuit 12.

Thus a DC coupled negative feedback circuit is provided from the terminal D at the output of the integrating circuit through the clipping circuit 15, the differential amplifier 12 and the gate circuit 13 to the input of the integrating circuit. Without such a negative feedback circuit, alteration of the value of the resistor 26 to vary the time constant of the integrating circuit 14 would cause changes in the potential of the input terminal of the integrating circuit 14, i.e. the gate potential of the field effect transistor 27, thus changing the potential of the output terminal D of the integrating circuit 14. In the circuit shown, since there exists a DC negative feedback loop as described, the potential of the point D is maintained substantially constant even when the resistance value of the resistor 26 is altered. The feedback circuit 16 feeds the output of the integrating circuit 14 back to the input terminal A of the bistable circuit 11 with the same polarity.

Referring to the effect of applying a positive triggering pulse to the input terminal 17, because of the application of this pulse the bistable circuit 11 shifts its stable point and has its potentials changed in such a manner that the point A becomes positive and the point B less positive. As a result, the differential amplifier circuit 12 is saturated with the transistor 21 in a fully conductive state, and the transistor 24 in a nonconductive state, so that the potential of the point C steps up to a positive value. This reverse-biases the diode 25 closing the gate circuit 13, whereby the integrating circuit 14 is released to perform its integrating function, resulting in the rectilinear decline of the potential of the point D. This potential decline is transmitted to the feedback circuit 16 and the clipping circuit 15, and since the potential of the point E is prevented from declining below a predetermined potential level by means of the diode 32 of the clipping circuit 15, there is no change in the relationship that the transistor 21 is in a conductive state and the transistor 24 is a nonconductive state.

The rectilinear decline of the point D potential is fed back as a change in current reaching the point A through the feedback circuit 16. Then the point D potential declines to a predetermined lever, the current passing through the tunnel diode 19 decreases, and the tunnel diode 19 changes its state to one having a low current value and a low potential. This makes the potential of the point A step down and the transistor 20 is rendered nonconducting, so that the point B potential steps up to a higher positive value. Consequently, the transistor 21 is rendered nonconducting, and the point C potential steps down to earth. Since the gate circuit 13 then opens, the potential of the point D at the output terminal of the integrating circuit 14 sharply goes up. As the potential of the point D goes up, the operating state of the clipping circuit 15 changes into one in which the diode 32 is nonconductive and the diode 31 is conductive, so that the differential amplifier circuit 12 returns to its linear-amplifying range again, thus returning and maintained the point D potential to a predetermined datum level.

The rise in the potential of the point D is also transmitted to the point A through the feedback circuit 16, and this transmission increases the current passing through the tunnel diode 19. The bias of the tunnel diode 19 when the point D potential settles at its datum level, though still of a low value, is just below that necessary to move the circuit into its set state. Thus, when an input triggering pulse is again applied to the input terminal 17, the action described is repeated.

The voltage change of the point A, or the input terminal of the bistable circuit 11, is shown in FIG. 3A; the voltage changes of the point B (in the full line) and the point E (in the broken line) or the input terminals of the differential amplifier circuit 12 are shown in FIG. 3B; the voltage change of the point C, or the output terminal of the differential amplifier circuit 12, is shown in FIG. 3C; the voltage change of the point D, or the output terminal of the integration circuit 14, is shown in FIG. 3D; and the change of the current reaching the point A from the feedback circuit 16 is shown in FIG. 3E. The time scales throughout FIG. 3 are identical.

Although embodiments of this invention have been described in detail with reference to the accompanying drawings, it is to be understood that the invention is not limited to the details shown and described, and that various changes and modifications can be made, such as properly locating a delay circuit to obtain a rectilinear voltage change of which the start is delayed in relation to the input triggering signal applied to the input terminal 17.

I claim:

1. Apparatus for generating a rectilinear sweep of voltage in response to a triggering signal, the apparatus comprising an integrating circuit of which the output is coupled to the input thereof through a first DC coupled negative feedback circuit including an amplifier such that, in operation, the integrating function of the integrating circuit is normally inhibited; and means for releasing the intregrating circuit to perform its integrating function and provide a rectilinear sweep of output voltage, comprising a bistable circuit coupled to the amplifier and responsive to a triggering signal to change its state from a reset state in which the amplifier is released and functions in the negative feedback circuit to inhibit the integrating circuit, to a set state in which the amplifier is inhibited in its feedback function and releases the integrating circuit to perform its integrating function, and a second feedback circuit from the output of the integrating circuit to the input of the bistable circuit to reset the bistable circuit when the output of the integrating circuit reaches a predetermined valve.

2. Apparatus according to claim 1, wherein a gate circuit is connected between the amplifier and the input to the integrating circuit, the arrangement being such that when the amplifier is released to inhibit the integrating circuit the gate circuit is opened, and when the amplifier is inhibited to release the integrating circuit the gate circuit is closed.

3. Apparatus according to claim 1, wherein the amplifier is a differential amplifier with one input coupled to the bistable circuit and the other input to the output of the integrating circuit.

4. Apparatus according to claim 3, wherein the coupling between the output of the integrating circuit and the differential amplifier includes a clipping circuit to limit the input to the differential amplifier from the integrating circuit to a predetermined level.

5. Apparatus according to claim 3, wherein the amplifier comprises two transistors arranged in a long-tailed pair circuit.

6. Apparatus according to claim 1, wherein the bistable circuit comprises an Esaki or tunnel diode and a transistor arranged to have its base driven by the diode.

7. Apparatus according to claim 2, wherein the gate circuit comprises a series-connected diode.

8. Apparatus according to claim 1, wherein the integrating circuit comprises a source of potential connected through a resistor to the gate electrode of a field-effect transistor coupled as a source-follower to the base of a Planar transistor and a capacitor connected from the collector of the Planar transistor to the gate electrode of the field-effect transistor.

9. Apparatus according to claim 4, wherein the clipping circuit includes a biased shunting diode and a series diode.